United States Patent [19]

Leidy et al.

[11] Patent Number: 5,697,995
[45] Date of Patent: Dec. 16, 1997

[54] BELT-DRIVEN GLASS GOB DISTRIBUTION WITH BROKEN BELT DETECTION

[75] Inventors: D. Wayne Leidy, Perrysburg; Derek W. Shinaberry, Toledo, both of Ohio

[73] Assignee: Owens-Brockway Glass Container Inc., Toledo, Ohio

[21] Appl. No.: 640,354

[22] Filed: Apr. 30, 1996

[51] Int. Cl.⁶ .................................................. C03B 7/20
[52] U.S. Cl. ........................ 65/29.12; 65/29.11; 65/158; 65/159; 65/160
[58] Field of Search ............... 65/29.11, 29.12, 65/158, 159, 160, 163, 164, 304; 73/507, 508; 364/473.02; 474/102, 119, 152, 166, 205, 237, 273

[56] References Cited

U.S. PATENT DOCUMENTS

| | | | |
|---|---|---|---|
| Re. 28,073 | 7/1974 | Trudeau | 65/304 |
| Re. 28,759 | 4/1976 | Bystrianyk et al. | 65/207 |
| 1,843,159 | 2/1932 | Ingle | 65/75 |
| 2,859,559 | 11/1958 | Mumford | 49/14 |
| 2,926,457 | 3/1960 | Trudeau | 49/5 |
| 2,944,648 | 7/1960 | Haines | 193/39 |
| 3,142,552 | 7/1964 | Martin | 65/229 |
| 3,189,178 | 6/1965 | Calleson et al. | 209/121 |
| 3,235,352 | 2/1966 | Hackett | 65/238 |
| 3,333,938 | 8/1967 | Zappia | 65/225 |
| 3,585,017 | 6/1971 | Trudeau | 65/304 |
| 3,592,624 | 7/1971 | Dahms | 65/304 |
| 3,597,187 | 8/1971 | Trudeau | 65/304 |
| 4,007,028 | 2/1977 | Bublitz et al. | 65/163 |
| 4,105,428 | 8/1978 | Adams | 65/77 |
| 4,145,204 | 3/1979 | Farkas et al. | 65/164 |
| 4,339,258 | 7/1982 | Martin | 65/79 |
| 4,357,157 | 11/1982 | Cardenas-Franco | 65/164 |
| 4,357,158 | 11/1982 | Garza | 65/225 |
| 4,402,721 | 9/1983 | Ericson et al. | 65/29.11 |
| 4,453,963 | 6/1984 | Larson et al. | 65/29.11 |
| 4,459,146 | 7/1984 | Farkas et al. | 65/29.11 |
| 4,469,501 | 9/1984 | Kingsbury et al. | 65/29.11 |
| 4,529,431 | 7/1985 | Mumford | 65/225 |
| 4,531,961 | 7/1985 | Hileman et al. | 65/164 |
| 4,599,101 | 7/1986 | Douglas et al. | 65/164 |
| 4,608,074 | 8/1986 | Knoth et al. | 65/164 |
| 4,636,238 | 1/1987 | Sidler | 65/29.11 |
| 4,691,508 | 9/1987 | Wolf | 57/78 |
| 4,697,091 | 9/1987 | Tamura | 290/45 |
| 4,723,977 | 2/1988 | Grant et al. | 65/29.11 |
| 4,793,846 | 12/1988 | Peterson | 65/164 |
| 4,793,847 | 12/1988 | Kawachi et al. | 65/225 |
| 5,135,559 | 8/1992 | Sasso et al. | 65/158 |
| 5,271,756 | 12/1993 | Peterson et al. | 65/163 |
| 5,405,424 | 4/1995 | Steffan et al. | 65/158 |

*Primary Examiner*—Donald E. Czaja
*Assistant Examiner*—Sean Vincent

[57] ABSTRACT

A molten glass gob distributor for a glass article manufacturing system that includes a gob discharge, and at least one scoop for receiving gobs from such discharge and distributing the gobs among a plurality of troughs or chutes leading to associated molds in a multiple-cavity IS machine. The scoop is coupled by a cogged drive belt to an electric motor for oscillating the scoop through a cyclic path adjacent to the troughs or chutes. Rupture at the drive belt is detected by coupling first and second electronic sensors to the motor and the scoop so as to provide respective first and second electrical signals as functions of motion at the motor and scoop. Rupture at the drive belt is indicated as a function of a difference between the first and second signals, indicating loss of synchronization between the drive motor and the associated scoop.

4 Claims, 1 Drawing Sheet

BELT-DRIVEN GLASS GOB DISTRIBUTION WITH BROKEN BELT DETECTION

The present invention is directed to manufacture of glass articles such as hollow glass containers, and more particularly to an improved method and apparatus for distributing gobs of molten glass among a plurality of mold stations or sections.

BACKGROUND AND SUMMARY OF THE INVENTION

Glass containers are conventionally formed in a machine that comprises a plurality of sections, in each of which there are one or more blank or parison mold cavities and transfer mechanisms that are synchronized with each other. This machine, called an individual section or IS machine, receives glass in the form of discrete mold charges or gobs. Molten glass from a furnace is cut into individual gobs, which are fed to a gob distributor. The purpose of the gob distributor is to distribute the gobs to the individual sections of the IS machine in the appropriate sequence in such a way that the glass gobs simultaneously arrive at the mold cavities in each section in sequence. U.S. Pat. Nos. 3,585,017 and 3,597,187, and patents noted therein, illustrate the general technology.

U.S. Pat. No. 2,859,559 discloses a gob distributor construction in which a scoop is disposed beneath a gob shear mechanism for receiving molten gobs in sequence, and is coupled by a shaft to a motor for feeding the individual gobs to spaced chutes or troughs. Each trough leads to the initial mold cavity of an associated section of an IS machine. Each cavity of the IS machine has an associated trough, and the scoop feeds gobs to the individual troughs in an appropriate sequence. U.S. Pat. No. 4,597,187 discloses a gob distributor in which a plurality of scoops each have an upper end disposed beneath an associated gob discharge, and a lower end disposed to swing through an arc adjacent to a corresponding plurality of troughs. Each scoop is carried by a scoop support frame, which in turn is coupled to a drive shaft. The multiple drive shafts are coupled to a gear transmission drive, in which the shafts are conjointly driven through associated gears by a single motor. Although this transmission drive arrangement maintains proper synchronism among the scoops, a problem arises when it is desired to change the number of scoops. An entirely new transmission drive is required.

U.S. Pat. No. 5,405,424 discloses a molten glass gob distributor in which a plurality of electric motors are individually coupled to associated individual scoops for selectively and individually rotating the scoops. The electric motors are all connected to a motor controller for synchronizing operation of the motors and rotation of the scoops to each other and to operation of the forming machine. In the preferred embodiment disclosed in such patent, the motors comprise electric servo motors each individually directly coupled to a single associated scoop, and the motor controller comprises an electronic servo motor controller operatively coupled to each servo motor and synchronizing operation thereof by means of a synchronizing input from the forming machine. It has been proposed in U.S. application Ser. No. 08/541,052 filed Oct. 11, 1995 to employ cogged drive belts to couple each motor to its associated scoop, so that the motors may be positioned offset from the axes of oscillation of the scoops. Such a construction improves the assembly and maintenance characteristics of the distributor assembly. However, the distributor must be closely monitored for potential failure or rupture at the drive belt, so that distributor operation can be immediately terminated to forestall potential interference and crash among the moving components.

It is therefore a general object of the present invention to provide a glass gob distribution system and method of the described character that employ non-contact techniques for monitoring drive belt operation, thereby reducing wear on the belt, that possess a fast reaction time, that are reliable and require little maintenance, that employ elements that are already provided in the glass gob distributor assembly for controlling glass gob distribution, and therefore that require no additional hardware, that accommodate elasticity of the belt during acceleration and deceleration, and/or that inherently monitor operation of the entire scoop drive train.

A molten glass gob distributor for a glass article manufacturing system in accordance with the present invention includes a gob discharge, and at least one scoop for receiving gobs from such discharge and distributing the gobs among a plurality of troughs or chutes leading to associated molds in a multiple-cavity IS machine. The scoop is coupled by a drive belt to an electric motor for oscillating the scoop through a cyclic path adjacent to the troughs or chutes. In accordance with the present invention, rupture at the drive belt is detected by coupling first and second electronic sensors to the motor and the scoop so as to provide respective first and second electrical signals as functions of motion at the motor and scoop. Rupture at the drive belt is indicated as a function of a difference between the first and second signals, indicating loss of synchronization between the drive motor and the associated scoop.

In the preferred embodiment of the invention, the sensors comprise position sensors that provide the associated first and second electrical signals as respective functions of change of position at the drive motor and scoop. Rupture at the drive belt is indicated when the difference between such change-of-position signals exceeds a preselected threshold. The motor in the preferred embodiment of the invention is coupled to the drive belt by a gear box having a gear reduction ratio N. The change-of-position signal from the scoop is multiplied by N prior to comparison with the first signal. In the preferred implementation of the invention, there are plural scoops for distributing gobs from plural discharges to associated molds in a multiple-cavity IS machine. Each scoop is independently driven by an associated motor and drive belt, with the motors being synchronized by a motor controller. Sensors are associated with each motor and scoop for monitoring condition of each belt. In the event of rupture at any belt, motion is terminated at all scoops.

BRIEF DESCRIPTION OF THE DRAWING

The invention, together with additional objects, features and advantages thereof, will be best understood from the following description, the appended claims and the accompanying drawing in which:

DETAILED DESCRIPTION OF PREFERRED EMBODIMENT

Figure 1:
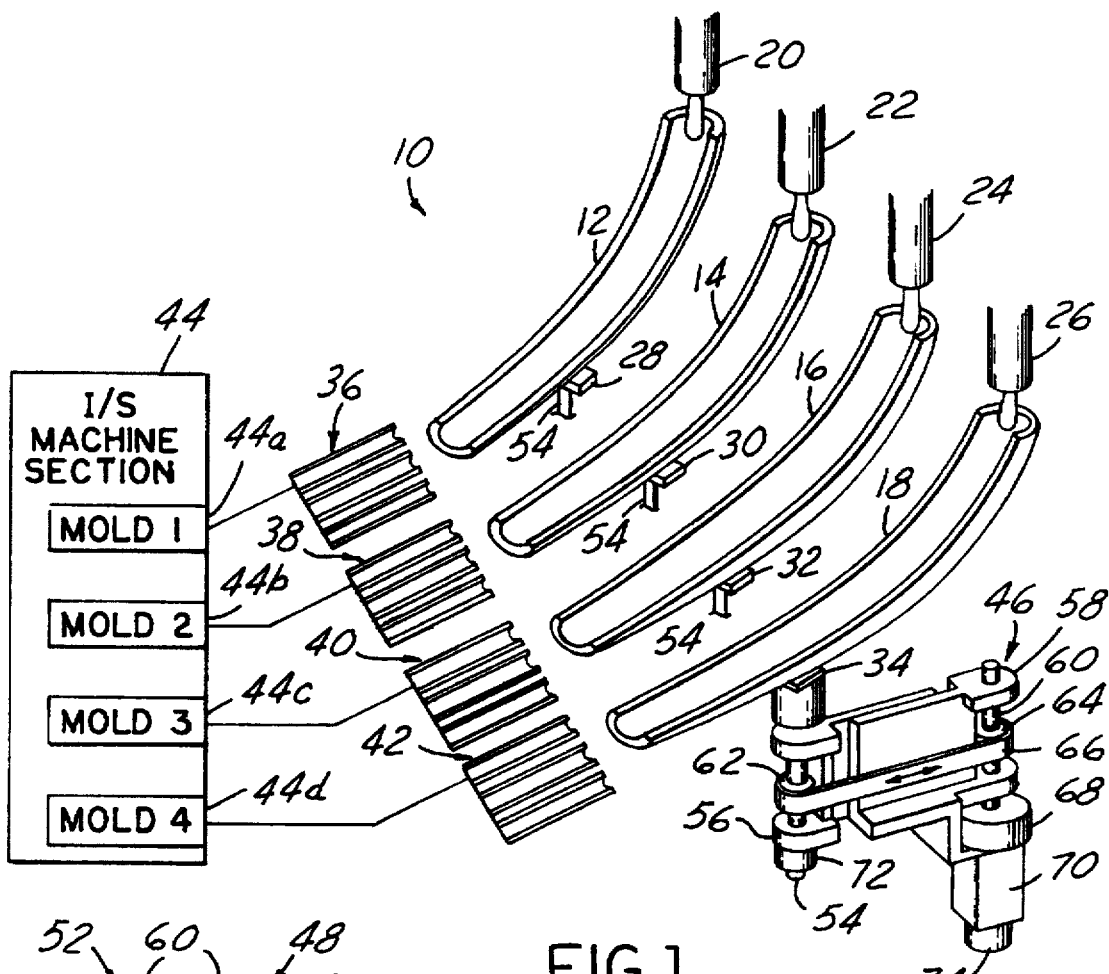
FIG. 1 is a fragmentary perspective view that illustrates a molten glass gob distribution system in accordance with one presently preferred embodiment of the invention.

FIG. 1 illustrates a glass gob distribution system 10 in accordance with one presently preferred embodiment of the invention as comprising four arcuate scoops 12, 14, 16, 18 each having an upper end positioned beneath an associated glass gob discharge orifice 20, 22, 24, 26. Each scoop 12, 14, 16, 18 is carried by an associated support bracket or frame 28, 30, 32, 34 to rotate through an arc about a fixed axis such that the upper end of each scoop remains positioned beneath its associated gob discharge orifice, while the lower end of each scoop swings through an arc adjacent to an associated array of troughs or chutes 36, 38, 40, 42. The number of troughs in each array 36, 38, 40, 42 is determined by the number of sections 44 in the IS machine. The number of scoops 12, 14, 16, 18, the number of orifices 20, 22, 24, 26 and the number of trough arrays 36, 38, 40, 42 are all determined by the number of molds or cavities in each section 44 of the IS machine. For example, four gob orifices, scoops and chute arrays are illustrated in FIG. 1 for use in connection with a so-called four-cavity IS machine in which each section 44 includes four parison molds 44a, 44b, 44c and 44d. A typical IS machine may include eight to twelve such machine sections 44, so that each chute array 36, 38, 40, 42 would include eight to twelve individual chutes positioned for alignment with the corresponding scoop 12, 14, 16, 18, of which only three chutes are illustrated in FIG. 1 for purposes of simplicity. The general purpose of gob distribution system 10 is to deliver glass mold charges or gobs to the four molds 44a, 44b, 44c and 44d simultaneously for each machine section 44 in sequence.

Figure 2:
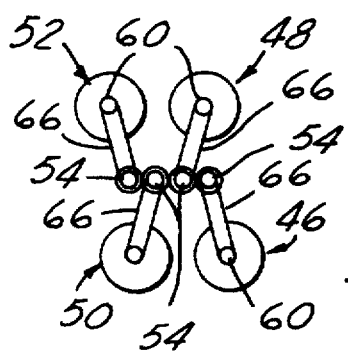
FIG. 2 is a fragmentary plan view of the motor and drive belt arrangement in the glass gob distribution system illustrated in FIG. 1.
Figure 3:
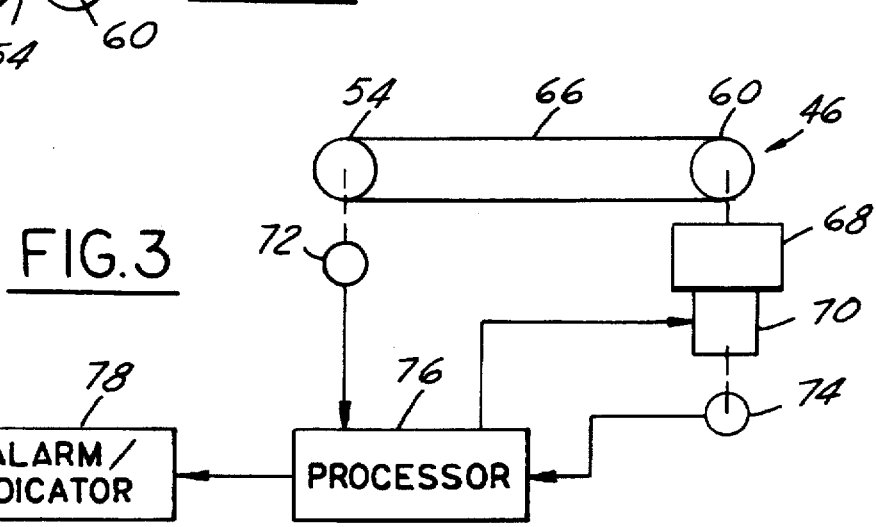
FIG. 3 is a functional block diagram of a system for controlling motion at one of the scoops in FIGS. 1–2 and detecting a ruptured drive belt.

Each scoop support frame 28, 30, 32, 34 is coupled to an associated scoop drive 46, 48, 50, 52 (FIG. 2). Scoop drives 46, 48, 50, 52 are all identical to each other, with scoop chive 46 being described in detail hereinafter in connection with FIGS. 1 and 3. A scoop drive shaft 54 is rotatably journaled in bearings carried by a scoop shaft support bracket 56, and is driveably coupled to scoop support frame 34. A second bracket 58 carries a shaft 60 that is journaled for rotation about an axis parallel to the axis of shaft 54. Shafts 54, 60 each carry an associated cogged pulley 62, 64, which are drivingly interconnected by a cogged drive belt 66. Brackets 56, 58 are adjustable with respect to each other for adjusting tension in drive belt 66 while maintaining parallel orientation of shafts 54, 60. Shaft 60 is connected by a gear box 68 to a three-phase electric servo motor 70. A resolver or other suitable sensor 72, 74 is operatively coupled to each associated shaft 54, 60 for providing respective electrical signals as a function of rotary position at the associated shaft.

Sensors 72, 74 provide their respective position-indicating signals to a distributor motion control processor 76. Processor 76 receives inputs from all sensors 72, 74 associated with all scoops 12, 14, 16, 18, and provides output signals to all motors 70 for controlling motion at all scoops 12, 14, 16, 18 independently of each other. In general, processor 76 generates a varying signal indicative of desired position at each scoop 12, 14, 16, 18, and generates a command signal for each motor 70 as a function of a difference between the desired position signal and the actual position signal indicated by the associated sensor 74. The command signals to motors 70 are applied as first and second torque commands to two phases of each motor, and a third torque command signal is applied at the third phase of each motor as a function of the sum of the associated first and second torque command signals. Position sensor 72 provides a signal indicative of actual position at each associated scoop 12, 14, 16, 18, and is monitored during initialization to set such actual position in the memory of processor 76. The output of sensor 72 may also be monitored during operation to sense any drift in position of the associated scoop. To the extent thus far described, the electronics for controlling motion at the several scoops 12, 14, 16, 18 is more fully disclosed in above-noted U.S. Pat. No. 5,405, 424, the disclosure of which is incorporated herein by reference for purposes of background.

In accordance with the present invention, the outputs of each pair of sensors 72, 74 are monitored by processor 76 to detect a belt-rupture condition at any of the scoops 12, 14, 16, 18, to provide an alarm indication at 78, and to arrest motion at all of the scoops and scoop drive mechanisms so as to prevent damage or crash of the scoops and associated drive hardware. More specifically, processor 76 receives the output signals $P_{72}$ and $P_{74}$ of sensors 72, 74 indicative of position at such sensors, and compares such signals according to the following relationship: $dP=(dP_{72}*N)-dP_{74}$, where $dP_{72}$ is the change in position at sensor 72, $dP_{74}$ is change of position at sensor 74, and N is the gear reduction ratio at gear box 68 ($dP_{74}$ could, of course, be divided by N to obtain the same effect). If $dP \leq dP_{to1}$ or within tolerance, no action is taken. However, if $dP > dP_{to1}$, indicating that the position change differential dP is outside of tolerance, a ruptured belt is indicated at 78 and motion of all scoops is terminated. Position differential tolerance $dP_{to1}$ is preselected empirically or on the basis of design to accommodate elasticity in the belt as the system accelerates and decelerates between successive scoop positions, and to reduce system noise sensitivity.

It will thus be appreciated that broken belt monitoring and detection is provided in accordance with the preferred embodiment of the invention by means of components that are already employed in the glass gob distributor for the purpose of scoop motion control. That is, broken belt detection is provided by means of monitoring the outputs of position sensors 72, 74, which are themselves already provided in the system for scoop motion control as disclosed in above-referenced U.S. Pat. No. 5,405,424. Thus, drive belt monitoring is accomplished in accordance with the present invention by simply including appropriate software in processor 76 for monitoring the sensor output signals. Belt condition is monitored without direct contact with the belt itself, thus eliminating this as a cause of potential belt wear. The reaction time of the monitor and control electronics is very fast, providing virtually instant termination of scoop motion at the gob distributor upon detection of a broken belt condition. Furthermore, the system is inherently reliable and requires little maintenance. Elasticity of the belt is accommodated by design or empirical selection of the position differential threshold for detecting a broken belt condition. In addition, the system of the invention monitors the entire scoop drive train, and thus automatically terminates operation of the gob distributor in the event of an excessive position differential caused by other than a raptured belt, such as bum-out of an electric motor 70 or failure at a gear box 68.

We claim:

1. A molten glass gob distributor for a glassware manufacturing system that includes a first plurality of gob discharge means and means for receiving glass gobs from each of said discharge means and distributing such gobs among a second plurality of glassware forming means, said receiving and distributing means comprising a plurality of scoops equal in number to said first plurality and each disposed to receive glass gobs from one of said discharge means, means mounting each said scoop to oscillate about an axis beneath the associated discharge means, a plurality of electric motors equal in number to said first plurality, a plurality of drive belt means equal in number to said first plurality and each coupling one of said motors to a corresponding one of said scoops such that each said motor controls motion at an associated scoop independently of the other motors and scoops, and means associated with each said scoop for indicating rupture at the associated drive belt means comprising:

- a plurality of first sensor means each directly coupled to one of said motors for providing a first electrical signal indicative of position at each said motor,
- a plurality of second sensor means each directly coupled to an associated one of said scoops for providing a second electrical signal indicative of position at each said scoop, and
- means for comparing each said first signal from one of said motors to an associated second signal from the second sensor associated with the scoop coupled by one of said belt means to said one motor to indicate rupture of the associated drive belt means as a function of a difference in position between the motor and scoop associated with that drive belt means.

2. The distributor set forth in claim 1 wherein said rupture-indicating means comprises means for comparing said difference between each said first signal and the corresponding second signal to a preselected threshold, and means for indicating a rupture at one of said drive belt means when the corresponding difference exceeds said threshold.

3. The distributor set forth in claim 2 further comprising a gear box having a gear reduction ratio N for operatively coupling each said motor to the associated said belt drive means, and wherein said rupture-indicating means comprises means for multiplying said second signal by N prior to comparison with said first signal.

4. A method of distributing molten glass gobs from a first plurality of glass gob discharge orifices among sections of an individual section glassware forming machine in which each section has a plurality of glassware molds equal in number to said first plurality, said method comprising the steps of:

(a) providing a plurality of gob scoops equal in number to said first plurality, (b) mounting each said scoop to pivot about an axis beneath one of said gob discharge orifices through an arc to distribute gobs from the orifice to one of said molds in each said sections in sequence, (c) coupling each of said scoops to an associated electric motor by means of a drive belt such that each said motor controls motion at an associated scoop through an associated drive belt independently of the remaining motors, scoops and belts, (d) monitoring angular position at each said motor, (e) mounting angular position at each said scoop, and (f) detecting rupture at any of said belts by comparing angular position at each scoop to angular positions at the associated motor.

\* \* \* \* \*